(12) United States Patent
Cunningham et al.

(10) Patent No.: US 9,973,795 B2
(45) Date of Patent: May 15, 2018

(54) METHOD FOR VIDEO SYNCHRONIZATION IN VIDEO DISTRIBUTION SYSTEMS

(71) Applicant: ClearOne Inc., Salt Lake City, UT (US)

(72) Inventors: John P. Cunningham, Austin, TX (US); Donald Shelly Zimmerman, Austin, TX (US)

(73) Assignee: CLEARONE INC., Salt Lake City, UT (US)

(*) Notice: Subject to any disclaimer, the term of this patent is extended or adjusted under 35 U.S.C. 154(b) by 0 days. days.

(21) Appl. No.: 14/837,321

(22) Filed: Aug. 27, 2015

(65) Prior Publication Data

US 2016/0066000 A1    Mar. 3, 2016

Related U.S. Application Data (60) Provisional application No. 62/042,340, filed on Aug. 27, 2014.

(51) Int. Cl.
| | |
|---|---|
| *H04N 7/173* | (2011.01) |
| *H04N 21/242* | (2011.01) |
| *H04N 21/2343* | (2011.01) |
| *H04N 21/231* | (2011.01) |
| *H04N 21/44* | (2011.01) |

(52) U.S. Cl.
CPC ......... *H04N 21/242* (2013.01); *H04N 21/231* (2013.01); *H04N 21/234381* (2013.01); *H04N 21/44004* (2013.01)

(58) Field of Classification Search
CPC ............................ H04N 21/242; H04N 21/231
USPC ............................................................ 725/90
See application file for complete search history.

(56) References Cited

U.S. PATENT DOCUMENTS

| | | | |
|---|---|---|---|
| 4,496,995 A * | 1/1985 | Colles | H04N 5/77 386/221 |
| 5,740,278 A | 4/1998 | Berger et al. | |
| 6,137,804 A | 10/2000 | Allison et al. | |
| 7,295,578 B1 | 11/2007 | Lyle et al. | |
| 7,440,476 B1 | 10/2008 | Yeh | |
| 7,894,489 B2 | 2/2011 | Shenoi | |
| 8,145,656 B2 | 4/2012 | He et al. | |
| 2003/0142058 A1 | 7/2003 | Maghielse | |
| 2005/0185719 A1* | 8/2005 | Hannuksela | H04N 19/00 375/240.27 |
| 2006/0034301 A1* | 2/2006 | Anderson | H04W 88/02 370/401 |
| 2006/0125835 A1 | 6/2006 | Sha et al. | |
| 2008/0172708 A1* | 7/2008 | Perry | H04W 72/005 725/110 |

(Continued)

OTHER PUBLICATIONS

STMicroelectronics, "STi5518 Single-Chip Set-Top Box Decoder with MP3 and Hard Disk Drive Support", Data Sheet; http://www.st.com, 2001, 294 pages.

*Primary Examiner* — Pankaj Kumar
*Assistant Examiner* — Sahar A Riaz
(74) *Attorney, Agent, or Firm* — Matthew J. Booth PC; Matthew J. Booth (57) ABSTRACT

This disclosure describes a method for video synchronization in video distribution systems that includes a system that re-synchronizes the video playback of a video synchronization device with that of a host device after any change by the host, interruption within the host, or interruption of data flow between a video source device and a video display device.

24 Claims, 4 Drawing Sheets

(56) References Cited

U.S. PATENT DOCUMENTS

| | | | |
|---|---|---|---|
| 2009/0024767 A1* | 1/2009 | Matsuda | G09G 5/006 710/15 |
| 2009/0044079 A1 | 2/2009 | De Lind et al. | |
| 2011/0043694 A1 | 2/2011 | Izuno et al. | |
| 2011/0055441 A1 | 3/2011 | Uchiyama | |
| 2012/0296658 A1 | 11/2012 | Smyth | |
| 2016/0065889 A1 | 3/2016 | Maurice | |

* cited by examiner

METHOD FOR VIDEO SYNCHRONIZATION IN VIDEO DISTRIBUTION SYSTEMS

CROSS REFERENCE TO RELATED APPLICATIONS

This application claims priority and the benefits of the earlier filed Provisional USAN 62/042,340, filed 27 Aug. 2014, which is incorporated by reference for all purposes into this specification.

TECHNICAL FIELD

The present disclosure generally relates to video and audio playback systems. More specifically, the present disclosure relates to a method for video synchronization in video distribution systems.

BACKGROUND ART

In a video distribution system that consists of video source devices (e.g., Blu-ray disc players, set-top boxes, camcorders, desktop PC, mobile devices, and so on) video encoder devices, video decoder devices and video display devices (e.g., computer or television displays, projectors, etc.) that operate independently of each other with a data connection between them, a method to synchronize the video playback frame rate of the decoder with the incoming video frame rate of the source must be implemented. This is required because the video source device has a timing device (i.e. a "clock") used to generate video at a specific frame rate and the video decoder has a different and independent timing device that plays video at a specific frame rate that is nominally the same as the frame rate of the source, but in reality is slightly different. This is because these hardware timing devices have a tolerance (e.g. plus or minus 100 parts per million for a crystal oscillator that nominally runs at 148.5 MHz) so that the actual clock frequency differs very slightly from one device to the other. Due to these device differences, over the course of a few seconds to a few minutes the timing device in the video source will drift relative to the timing source in the video decoder. Some video distribution systems include a multi-conductor cable to connect the video encoder to the video decoder. These cables carry a specific signal on one of the conductors called a "Genlock" or generator lock signal. This signal allows the video decoder to perform clock corrections in order to keep the decoder's frame rate exactly synchronous with the video frame rate of the encoder. Generally, the encoder's frame rate is synchronized to that of the video source by a pixel clock signal sent from the source to the encoder's video input port.

Depending on a video source or a type of video content, the frame rate may typically range from approximately 24 Hz to approximately 60 Hz or 0 Hz in case of static images.

The capabilities of a television display or computer monitor can be queried over a high definition multimedia interface (HDMI) link by a video source or video decoder device that is directly connected to that display using a well known standard communication protocol called Extended Display Identification Data (EDID). The EDID information provided by a display enables the source or decoder to determine what frame rates and resolutions that display supports. This allows the source or decoder to present video information in a form that can be consumed by the display. Once the source or decoder determines that the display can correctly consume its video content, it will begin to play that content at a frame rate and resolution supported by the display. When this is done, the video display will synchronize itself with the directly connected video source or decoder device as long as a pixel clock signal is provided as required by the HDMI standard. The pixel clock tells the display exactly when to draw each pixel on the display.

If the decoder device is a personal computer, or a device that supports add-in cards, the hardware timing device in that decoder might be a crystal oscillator on a motherboard that drives a high resolution timer in the main CPU on that motherboard. This high resolution timer might be used by an operating system that implements a preemptive multitasking method that allows many independent threads of software to run in parallel. One of these software threads could be responsible for reading or capturing frames or sub-frames of video and sending that video data across a "bus", or multi-conductor interface that the add-in cards are plugged into in order to write the video data into memory on the add-in card. A sub-frame of video is a fraction of a frame that could, for example, be one fourth of a frame, or one eighth of a frame or some other sub-frame fraction of a frame. The add-in card can be designed so that it stores one full frame of video in its memory. Sometimes, the frame rate of the source material will change. For example, the initial menu screens that are shown at the beginning of a Blu-ray movie that allow a user to select language options or give a user the ability to jump to a particular scene in the movie may be generated at 60 frames per second, while the actual movie content could be recorded at 24 frames per second. Since the video add-in card could be playing video at 60 frames per second, the card could request new video data before the video source is ready to provide new video data if the new data is only being generated at 24 frames per second. Without any information to display and without some method to synchronize the video rendering process on the card with the rate of video generation by the host, the video card might display incorrect data, leading to objectionable video artifacts. This can occur even if the resolution of the video material does not change. The add-in card will generally have its own independent video frame clock that it uses to synchronize processing on the card. If this is a free-running clock, the video playback can become de-synchronized from the clock on the motherboard, so that when new frames of video at a new frame rate start to be sent to the card, they may start playing at a random position on the display leading to video that is vertically shifted. This de-synchronization can also occur if there is an interruption of processing within the host's pre-emptive multitasking operating system. The video card needs to play video at a continuous rate in order to refresh the image on the display to prevent the screen from going blank. If the host becomes excessively loaded, the host may not be able to respond in a timely manner to a request from the card for a new frame or subframe of video. This situation is referred to as an "under-run" because the video card is starved of data and its video playback buffers are under-filled. Alternatively, de-synchronization can occur if the video encoder and the video decoder are connected by an Internet Protocol (IP) network rather than a simple point-to-point multi-conductor cable. The IP network may experience congestion or packet loss that could cause the decoding device to be starved of data. As a result of any of these events, user experience and viewing comfort could be significantly diminished.

Therefore there exists a need for a robust solution that prevents frame drops, video shifting, video stuttering and other video artifacts while keeping the video source and the video decoding device in synchronization with each other.

This application is related to U.S. application Ser. No. 14/837,317, entitled: A CONTROL MECHANISM FOR VIDEO OUTPUT, filed 27 Aug. 2015, now U.S. Pat. No. 9,807,408, which is incorporated by reference for all purposes into this specification.

SUMMARY OF INVENTION

This disclosure describes a method for video synchronization in video distribution systems. In one aspect, the present disclosure provides a system that re-synchronizes the video playback of a video synchronization device with that of a host device after any change by the host, interruption within the host, or interruption of data flow between a video source device and a video display device. The system comprises: a host device, with a processor and a memory, generating a plurality of video data signals comprising video subframes at a first frame rate, wherein the host device stores the generated plurality of video data signals and a plurality of parameters comprising a predefined frame size in the memory based on an extended display identification data received from the display; and a video synchronization device, with a video synchronization device process and video synchronization device memory, that is in communication with the host memory, being initialized with the plurality of parameters, wherein the video synchronization device is configured to: receive at least one fragment or slice of a video frame among the generated plurality of video data signals from the host device, wherein the at least one video subframe has a predefined relationship to the predefined frame size (i.e. ½ of a video frame, ¼ of a video frame, etc.); transmit the video data to the display; request the host device for a next video subframe having the predefined frame size; set a condition flag in the memory of the video synchronization device that can be read by the host if the next video subframe is not available at the required time to be transmitted to the display in order to notify the host that an underrun has occurred, reset the video playback pointer of the add-in card to row one, column one of a new frame, continuously send the previously received video data to the display using a "frame repeat" function and wait indefinitely for the host to provide new data representing the pixel at the first row and first column of a new video frame once the flow of video data into the host has resumed. In another aspect, this disclosure describes how the video synchronization device flushes existing data in the memory of the add-in card, resets its video playback pointer to row one column one of a new frame, and notifies the host that it is ready to begin video playback if it is notified by the host that the frame rate of incoming video must change.

Other and further aspects and features of the disclosure will be evident from reading the following detailed description of the embodiments, which are intended to illustrate, not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

This disclosure describes a method for video synchronization in video distribution systems. This disclosure describes numerous specific details in order to provide a thorough understanding of the present invention. One ordinarily skilled in the art will appreciate that one may practice the present invention without these specific details. Additionally, this disclosure does not describe some well-known items in detail in order not to obscure the present invention.

In various embodiments of the present disclosure, definitions of one or more terms used in the document are provided below.

A "Video Source" is used in the present disclosure in the context of its broadest definition. The video source may refer to one or more computing devices capable of establishing a communication channel for providing digital video signals in a communication session. Examples of the computing devices may comprise, but are not limited to, a desktop PC, a personal digital assistant (PDA), a server, a mainframe computer, a mobile computing device (e.g., mobile phones, laptops, tablets, etc.), an internet appliance (e.g., gateway, router, set-top box, video digital signage player, etc.), and calling devices (e.g., an internet phone, video telephone, etc.). The video source may be based on or run a variety of operating system platforms such as Microsoft Windows, Linux, Android, and so on.

A "Video Encoder" is used in the present disclosure in the context of its broadest definition. The video encoder may refer to one or more computing devices capable of capturing video and encoding it using one of a number of video compression standards such as H.264, H.265, motion JPEG, or using other proprietary methods designed to prepare a video signal for transmission over some sort of physical point to point, broadcast, or network link. Examples of computing devices may include, but are not limited to, a desktop PC, a personal digital assistant (PDA), a server, a mainframe computer, a mobile computing device (e.g. mobile phones, laptops, tables, etc.), an internet appliance (e.g., a gateway, router, set-top box, video digital signage player with an encoding function, etc.), and calling devices (e.g., an internet phone, videotelephone, etc.).

A "Video Decoder" is used in the present disclosure in the context of its broadest definition. The video decoder may refer to one or more computing devices capable of receiving video from a direct, over-the-air, or network connection to other devices and decoding it from a form used to facilitate transmission into a form used to facilitate rendering on a display. Examples of computing devices may include, but are not limited to, a desktop PC, a personal digital assistant (PDA), a server, a mainframe computer, a mobile computing device (e.g. mobile phones, laptops, tables, etc.), an internet appliance (e.g., a gateway, router, set-top box, video digital signage player with an encoding function, etc.), and calling devices (e.g., an internet phone, videotelephone, etc.).

A "Video Display" is used in the present disclosure in the context of its broadest definition. The video display may refer to a variety of computing devices, such as those mentioned above, being integrated or associated with one or more video displays including, but not limited to, monitors and projectors.

A "Frame Rate" is used in the present disclosure in the context of its broadest definition. The frame rate may refer to the number of video frames outputted per second. The frame rate may be expressed in Hertz (Hz).

A "Refresh Rate" is used in the present disclosure in the context of its broadest definition. The refresh rate may refer to the number of times in a second that a display updates its screen with a video frame. The refresh rate may be expressed in Hertz (Hz).

A "Vertical Frequency" is used in the present disclosure in the context of its broadest definition. The vertical frequency may refer to the number of times per second at which each pixel of a video frame is drawn from top to bottom on a display screen. The vertical frequency may be expressed in Hertz (Hz).

A "Horizontal Frequency" is used in the present disclosure in the context of its broadest definition. The horizontal frequency may refer to the number of times per second at which a single line of pixels of a video frame is drawn from left to right on a display screen. The horizontal frequency may be expressed in Hertz (Hz).

A "Master Clock" is used in the present disclosure in the context of its broadest definition. The master clock may refer to the clock of a video source that is distributed among all connected devices. The master clock may be expressed in Megahertz with an accuracy expressed in a certain number of parts per million (ppm).

A "Horizontal Front Porch" is used in the present disclosure in the context of its broadest definition. The horizontal front porch may refer to the right border of a display screen.

A "Horizontal Back Porch" is used in the present disclosure in the context of its broadest definition. The horizontal back porch may refer to the left border of a display screen.

A "Vertical Back Porch" is used in the present disclosure in the context of its broadest definition. The vertical back porch may refer to the top border of a display screen.

A "Vertical Front Porch" is used in the present disclosure in the context of its broadest definition. The vertical front porch may refer to the bottom border of a display screen.

A "Channel" is used in the present disclosure in the context of its broadest definition. The channel may refer to a set of uncompressed audio samples of a predetermined size, e.g., 16 bits.

The numerous references in the disclosure to a method for video synchronization in video distribution systems is intended to cover any and/or all devices capable of performing respective operations on a display in a video viewing environment relevant to the applicable context, regardless of whether or not the same are specifically provided.

Embodiments are disclosed in the context of video playback systems capable of receiving or rendering video signals comprising one or more video frames or images. Other embodiments may be applied in the context of other use cases (e.g., television, video surveillance systems, gaming consoles, etc.) involving display of video signals from one or more video sources onto a display, in which each of the video sources and the display are operating with independent clocks for video capture and playback. Such embodiments may comprise a video synchronization device that synchronizes video frames between the video source and the display.

Figure 1A:
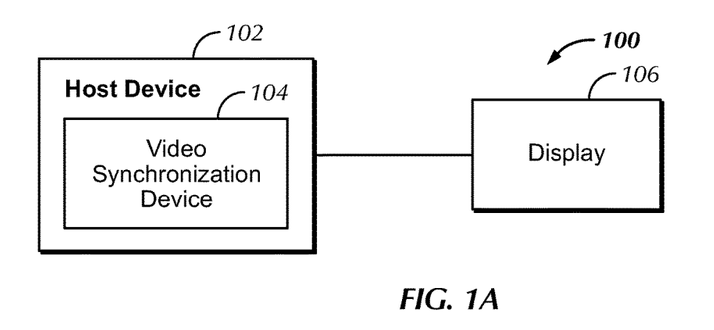
FIG. 1A Illustrates a system in which disclosed invention may be implemented.

FIG. 1A Illustrates a system in which a video synchronization device may be implemented, in accordance with an embodiment of the present disclosure. The system 100 includes a host device 102, such as a computer, a video synchronization device 104, and a display 106. In a preferred embodiment, the video synchronization device 104 may be connected to the computer 102, in turn the video synchronization device 104 may be connected to the display 106. The computer 102, having a central processing unit (CPU) and a memory, may generate video via a network or point to point link to a remote video encoder or an over-the-air RF link to a remote encoder, which in turn transmits video data signals based on the video source to the video synchronization device 104. The video synchronization device may receive the video data signal through a video input port to synchronize video frames between the video sources and the display 106. The video synchronization device ensures that if video data from the host is interrupted for any reason, there is a procedure that enables the video synchronization device to inform the host about the problem and restart video playback from a known starting point. In one embodiment, the video synchronization device may transmit the synchronized video data signal to the display via a HDMI cable. The video synchronization device may be connected to the computer 102 via a PCIe (Peripheral Component Interconnect Express) bus (not shown). The video card may process and manipulate video signal generated from the computer 102. The video synchronization device 104 may represent any of a wide variety of devices, such as a video adapter, graphic add-in-boards, and the like, which provides video playback synchronization as discussed in detail below.

In another embodiment, the components of the system 100 may be a networked environment, in which each of the components communicate over a network. The network may include any software, hardware, or computer applications that can provide a medium to exchange signals or data in any of the formats known in the art, related art, or developed later.

In yet another embodiment, the host device 102 may be integrated or associated with one or more displays. Examples of the display 106 include, but not limited to, monitors and projectors. The host device 102 may interact with the video synchronization device 104 using any transmission media known in the art, related art, or developed later that is compliant to any of the video codec standards such as those mentioned above. In one example, the host device 102 may interact with the video synchronization device 104 using HDMI cables.

In a further embodiment, the video synchronization device 104 may assist the host device 102 to remain compliant to display parameters (e.g., resolution, timing, etc.) of the display 106 and avoid video frame drops during transmission of the video data signals in response to extended display identification data (EDID) received from the display 106. EDID may include a variety of information including, but not limited to, manufacturer name and serial number, product type, phosphor or filter type, timings supported by the display such as the display 106, display size, luminance data and pixel mapping data (for digital displays only).

In a further embodiment, the video synchronization device 104 may be configured to remove existing video transmission settings related to or embedded in the last outputted or transmitted video frame and request a new frame from the host device 102 upon detecting a loss of synchronization between the display 106 and the host device 102. The video transmission settings may include various parameters including video clock, video width (i.e., pixels per line), video height (i.e., number of lines), horizontal front porch (HFP), horizontal back porch (HBP), horizontal sync pulse (Hsync), vertical front porch (VFP), vertical back porch (VBP), vertical sync pulse (Vsync), DMA (Direct Memory Access) pixel size, video clock adjust, and target connection status. Such removal of the last transmitted frame data, represented by the existing video transmission settings, prevents any overlap between the last transmitted video frame and a new frame to be transmitted. Simultaneously, the video synchronization device 104 may update the video clock to transmit the new frame upon being received from the host device 102, discussed later in greater detail. Upon receiving the new frame, the video synchronization device 104 may transmit the new frame using the updated video transmission settings. For example, the video synchronization device 104 may transmit half a video slice having a size of 640×240 pixels for a new frame with a resolution of 640×480 pixels in compliance with the Direct Memory Access (DMA) block transfer size.

In a further embodiment, the video synchronization device 104 may use the EDID to dynamically preset or update the video clock frequency, e.g., 60 Hz, at which it outputs video data signals. Accordingly, the video synchronization device 104 may adjust its output frame rate to substantially match it with the refresh rate or nominal frame rate received from the EDID for one or more displays (e.g., display monitor, projector, etc.) such as the display 106. In some embodiments, the video synchronization device 104 may adjust the external or master clock frequency, e.g., 60 Hz, of the host device 102, in which such master clock frequency may be preset according to the implemented video communication standard, such as HDMI standard. As such, the display 106 may behave as an HDMI target device to receive the video data signals from the host device 102 via the video synchronization device 104.

In a further embodiment, the host device 102 may use the EDID received from the video synchronization device 104 along with information on the frequency with which the video synchronization device is requesting new video data in comparison with the rate at which the host device is receiving video data from the remote video encoder to dynamically adjust the video transmission settings in order to adjust the frame rate of the video synchronization device 104.

The video synchronization device 104 may represent any of a wide variety of devices capable of providing frame rate adaptation services to the network devices. The video synchronization device 104 may be implemented as a standalone and dedicated device including hardware and installed software, where the hardware is closely matched to the requirements and/or functionality of the software.

Alternatively, the video synchronization device 104 may be implemented as a software application or a device driver on existing hardware devices such as a display card (not shown). The video synchronization device 104 may enhance or increase the functionality and/or capacity of the network to which it is connected. In some embodiments, the video synchronization device 104 may expose its computing environment or operating code to a user, and may include related art I/O devices, such as a keyboard or display. The video synchronization device 104 of some embodiments may, however, include software, firmware, or other resources that support remote administration and/or maintenance of the video synchronization device 104.

In some embodiments, the video synchronization device 104 either in communication with any of the networked devices such as the host device 102, or independently, may have video, voice, and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the video synchronization device 104 may comprise or implement one or more real time protocols (e.g., session initiation protocol (SIP), H.261, H.263, H.264, H.323, etc.) and non-real time protocols known in the art, related art, or developed later to facilitate communication of video data signals and audio data signals between the host device 102 and the display 106, or any other compatible network devices.

In some other embodiments, the video synchronization device 104 may be configured to convert communications, which may include instructions, queries, data, etc., from the host device 102 into appropriate formats to make these communications compatible with the display 106, and vice versa. Consequently, the video synchronization device 104 may allow implementation of the host device 102 to employ different technologies or services using a proprietary technology managed by different organizations, e.g., a third-party vendor.

The video synchronization device 104 may be powered by, in one embodiment, an external power supply unit, such as an external battery or a controlled AC supply that provides sufficient voltage to run the video synchronization device 104. In another embodiment, the video synchronization device 104 may be electrically connected to at least one of the host device 102 or the display 106 via a suitable wired link (such as via a USB cable) or wireless link to draw power for operation in the system 100.

The network contemplated herein may include, but is not limited to, social media platforms implemented as a website, a unified communication application, or a standalone application. Examples of the social media platforms may include, but are not limited to, Twitter™, Facebook™, Skype™, Microsoft Lync™, Cisco Webex™, and Google Hangouts™. Further, the network may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. Network may include multiple networks or sub-networks, each of which may include, e.g., a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The host device 102 may refer to a variety of computing devices known in the art, related art, or developed later including video player (e.g., a Blu-ray disc player), an imaging device (e.g., camera, camcorders, etc.), a digital signage player, a set-top box, a smart television, a desktop personal computer (PC), a mobile computing device (e.g., a personal digital assistant (PDA), a notebook, a laptop, a tablet, a mobile phone, etc.), a video calling device (e.g., a video phone, an internet phone, etc.), or any other device, component, object or system having any combination of similar devices capable of rendering video data signals based on any of a variety of known, related art, or later developed video codec standards including H.264, H.265, MPEG1, MPEG2, and HDMI. The host device 102 may be based on or run a variety of operating system platforms such as Microsoft Windows, Linux, Android, Mac OS X, Apple iOS, and so on.

Figure 1B:
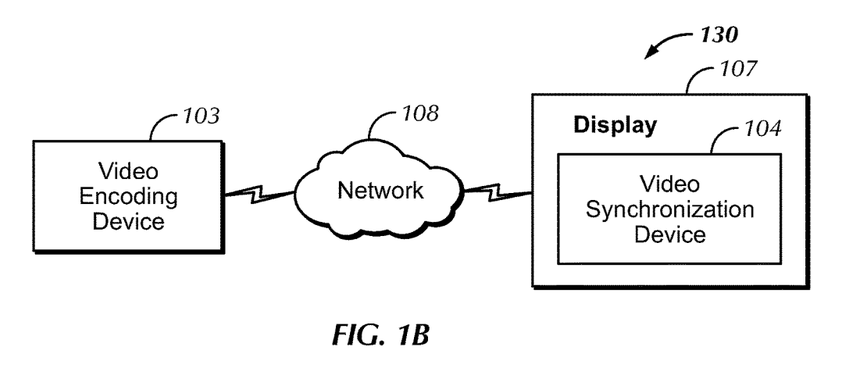
FIG. 1B illustrates another embodiment of the disclosed invention.

FIG. 1B illustrates another embodiment of the disclosed present invention. The network environment includes a system 130 comprising one or more video encoder devices such as a video encoding device 103 in communication with the video decoder 106. In this embodiment, the video synchronization device 104 may be connected as a peripheral device or integrated to either of the host device (not shown) or a target device such as the display 107. In some other embodiments, the display 107 may be integrated or associated with any of a variety of computing devices such as those mentioned above. By way of an example, the display 107 may be a monitor connected to a computer (the host device).

In further embodiments, the video synchronization device 104 may be operatively connected or integrated with any network appliance (not shown) configured to establish a network 108 between the host device 102 and any computing device behaving as the target device. At least one of the video synchronization device 104 and the network appliance may be capable of operating as or providing an interface to assist exchange of software instructions and video data signals between the host device 102 and such target device. In some embodiments, the network appliance may be preconfigured or dynamically configured to include or control the video synchronization device 104 integrated with other devices. For example, the video synchronization device 104 may be integrated with the host device 102 or any other computing device (not shown) connected to the network 108. The host device 102 may comprise a module (not shown), which may enable the video synchronization device 104 being introduced to the network appliance, thereby enabling the network appliance to invoke or control the video synchronization device 104 as a service. Examples of the network appliance may include, but are not limited to, a DSL modem, a wireless access point, a set-top box (STB), a router, a base station, and a gateway having a predetermined computing power sufficient for implementing the video synchronization device 104.

Figure 2:
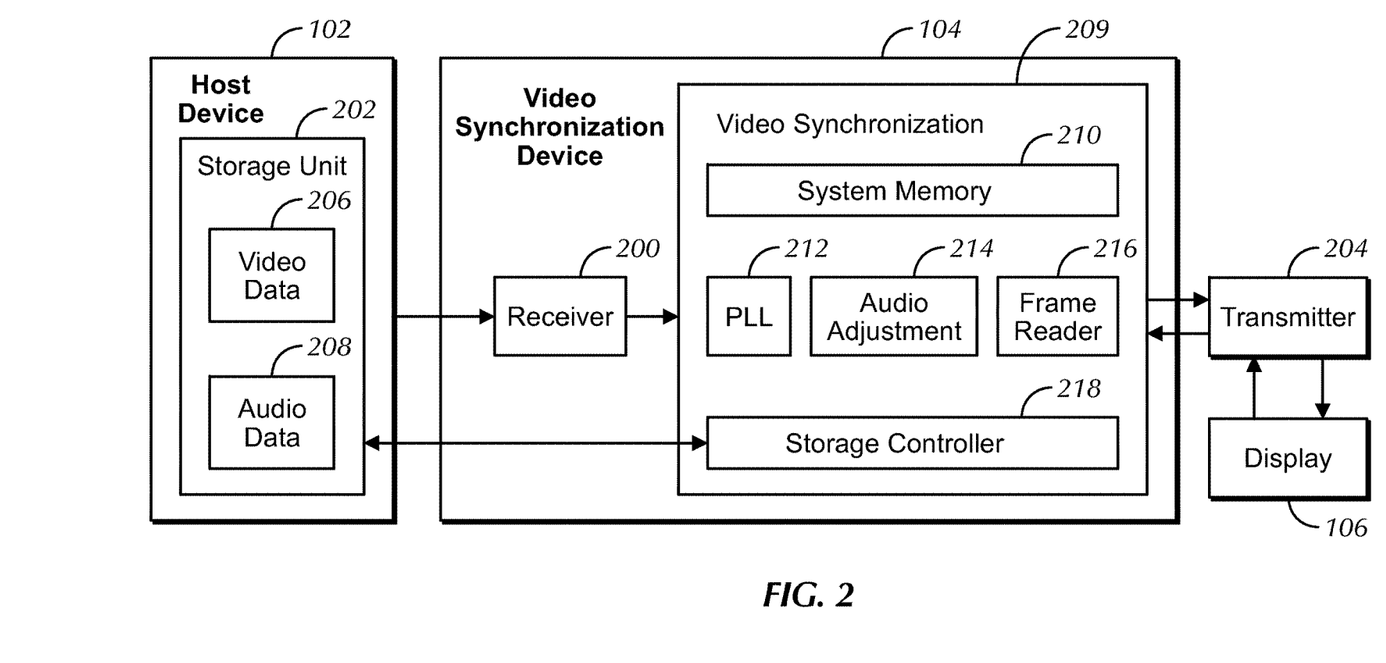
FIG. 2 discloses a hardware embodiment of the disclosed invention.

FIG. 2 illustrates the video synchronization device 104 in accordance with an embodiment of the present disclosure. The video synchronization device 104 may be implemented as a single physical device (e.g., a computing device, a processor or an electronic storage device) or a combination of multiple physical devices that are operatively connected or networked together. The video synchronization device 104 may be implemented in hardware or a suitable combination of hardware and software. In some embodiments, the video synchronization device 104 may be a hardware device including processor(s) (not shown) executing machine readable software instructions for handling video data signals and audio data signals received from the host device 102. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processor(s) (not shown). The processor(s) may include, for example, microprocessors, microcomputers, microcontrollers, digital signal processors, central processing units, state machines, logic circuits, and/or any devices that manipulate signals based on operational instructions. Among other capabilities, the processor(s) may be configured to fetch and execute computer readable instructions in a system memory 210 associated with the video synchronization device 104 for performing tasks such as signal transcoding, data processing, input/output processing, power control, and/or other functions.

In some embodiments, the video synchronization device 104 may include, in whole or in part, a software application working alone or in conjunction with one or more hardware resources. Such software applications may be executed by the processor(s) on different hardware platforms or emulated in a virtual environment. Aspects of the video synchronization device 104 may leverage known, related art, or later developed off-the-shelf software. Other embodiments may comprise the video synchronization device 104 being integrated or in communication with a mobile switching center, network gateway system, Internet access node, application server, IMS core, service node, or some other communication systems, including any combination thereof. In some embodiments, the video synchronization device 104 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The video synchronization device 104 may include a variety of known, related art, or later developed interface(s) (not shown), including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

The video synchronization device 104 may operate in communication with a storage unit 202 and a transmitter 204. The storage unit 202 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. In some embodiments, the storage unit 202 may be installed on, integrated with, or operatively connected to the host device 102, as illustrated. In some other embodiments, the storage unit 202 may be installed on, integrated with, or operatively connected to a server such as the server 110, a network appliance, or any other networked devices.

In one embodiment, the storage unit 202 may include a video data module 206 and an audio data module 208. The video data module 206 may store video data signals carrying video frames and the audio data module 208 may store audio data signals from the host device 102. The audio data signals may be encoded in various file formats known in the art, related art, or developed later including pulse code modulation (PCM), waveform audio file (WAV), MP3 (or MPEG-2 Audio Layer III), formats and so on, having one or more audio channels, e.g., mono channel having a single channel, stereo channels having two channels, etc. However, these channels may be interpreted by a receiving device, such as the transmitter 204, the display 106, or any networked computing device, which may be operatively coupled to a visual output such as the display 106, based on an audio standard being implemented on such receiving device. For example, the transmitter 204 being implemented as an HDMI device may refer to one channel as having left and right sides, so two channels of PCM may be received as a single channel by such HDMI transmitter 204. In some embodiments, the transmitter 204 may be configured to encode the video data signals and the audio data signals being received from the Video synchronization device 104 into any of a variety of encoding standards known in the art, related art, or developed later, and transmit the encoded data signals to the display 106.

In some embodiments, the storage unit 202 may include one or more databases, which may be sub-divided into further databases for storing electronic files. The storage unit 202 may have one of many database schemas known in the art, related art, or developed later. For example, a database may have a relational database schema involving a primary key attribute and one or more secondary attributes. In some embodiments, the Video synchronization device 104 may perform one or more operations, but not limited to, reading, writing, indexing, encoding, decoding, manipulating and updating the video data signals and the audio data signals, and may communicate with various networked computing devices such as the host device 102 and/or the display 106, which may be separately located or integrated with the host device 102.

The Video synchronization device 104 may further comprise a receiver 200 and an video synchronization module 209. The receiver 200 may receive and handle the video frames of the video data signals and the audio data signals in any predefined media format known in the art, related art, or developed later received from the host device 102. The receiver 200 may send the video frames in the received video data signals, followed by the audio data signals, to the video synchronization module 209 for further processing.

The video synchronization module 209 may be implemented using a field programmable gate array (FPGA), an erasable programmable logic device (EPLD), a system on a chip (SOC), or any other type of device known in the art, related art, or developed later. In one embodiment, the video synchronization module 209 may be configured to receive video transmission settings from the host device 102 for streaming video data signals carrying video frames. In another embodiment, the video synchronization module 209 may be configured to remove existing video transmission settings of the last transmitted video frame and receive new video transmission settings for a new video frame being transmitted upon detecting loss of frame synchronization with the display 106. In yet another embodiment, the video synchronization module 209 may be configured to adjust the video clock based on the output frame rate being relatively different from the input frame rate for the video data signals. In still another embodiment, the video synchronization module 209 may be configured to receive video data signals including new video frames based on the adjusted video clock. In a further embodiment, the video synchronization module 209 may be configured to transmit the video data signals including new video frames in a predefined representation based on the received new video transmission settings and the adjusted video clock. In some embodiments, the video synchronization module 209 may be configured to adjust audio data rate based on the frame rate of the new video frame being transmitted. In some other embodiments, the video synchronization module 209 may be configured to terminate streaming of the video frames based on the display 106 being disconnected. In a further embodiment, the video synchronization module 209 may re-send or repeatedly send a previous video frame to the display 106 if a new video frame or a next video frame is not received from the host device 102 within one or more preset time intervals or a predetermined duration.

In one embodiment, the video synchronization module 209 may include the system memory 210, a phase locked loop (PLL) module 212, an audio adjustment module 214, a frame reader 216, and a storage controller 218. Similar to the storage unit 202, the system memory 210 may comprise of any computer-readable medium known in the art, related art, or developed later such as those mentioned above.

The system memory 210 may store at least one of (1) video transmission settings for each video frame; (2) a log of profiles of connected devices and associated communications including instructions, queries, conversations, data, and related metadata; (3) EDID retrieved by the video synchronization module 209 from the display 106 or any other networked device; or (4) one or more video frames received from the host device 102 either directly or via the receiver 200.

The PLL module 212, which is fed with an external clock (e.g., Nominally 24 or 27 MHz), is used to generate a pixel clock which may be adjusted up or down by the host device 102. The host may determine the change in video frame rate using the video transmission settings stored in the system memory 210. The video clock refers to a pixel clock used for processing pixel data. The frame rate of the video playback depends on this video clock as represented in Equation 1.

$$\text{Frame Rate} = \frac{\text{Video Clock}}{[(\text{video height} + HFP + Hsync + HBP) * (\text{video width} + VFP + Vsync + VBP)]} \quad (1)$$

The host may send control signals to adjust the PLL module 212 in a variety of ways known in the art, related art, or developed later to provide the video clock. In one embodiment, the host may adjust the output clock of the PLL in steps, e.g., ranging from −7 to +7 or 5 KHz steps, to determine a desired video clock that provides a frame rate. At the video synchronization module 209, the PLL module 212 and inherently the host device 102, synchronizes with the display 106.

The audio adjustment module 214 may be configured to update the audio data rate (hereinafter also referred to as audio clock rate or audio clock frequency) in response to the frame rate (or in other words, the video clock) at which the video frames are being transmitted by the video synchronization module 209. In some embodiments, the audio data rate may be updated in response to a default video clock (e.g., the external clock). Such update or adjustment may be required because the audio data rate has an inverse relationship with the video clock. A faster video frame rate yields less audio data per video frame, if the audio clock rate remains unchanged. Typically, an audio clock rate is known for a particular frame rate based on a predefined resolution of a display 106. Hence the updated or adjusted audio clock rate may be determined as shown in Equations 2 and 3.

New audio clock rate=Audio clock rate for a predefined frame rate*frame rate ratio (2)

Frame rate ratio=New video frame rate/predefined frame rate (3)

Further, the frame reader 216 may be configured to retrieve video data from the video data module 206 of the storage unit 202, unpack the retrieved video data such as RGB data, and transfer it to the transmitter 204, e.g., in 24 bit format, based on the blanking periods, the horizontal and vertical sync, and the resolution stored in the system memory 210.

The storage controller 218 may be configured to assist the video synchronization module 209 to access and retrieve data from the storage unit 202. The storage controller 218 may include an internal PLL being fed with an external clock, e.g., 50 MHz, to create a base clock (e.g., 250 MHz) and a half clock output (e.g., 125 MHz). The half clock output may be used as the main clock for the video synchronization module 209 to read data from and write data to the storage unit 202. This keeps various components of the video synchronization module 209 to remain on the same clocking tree, thereby minimizing clock domain crossing issues.

Figure 3:
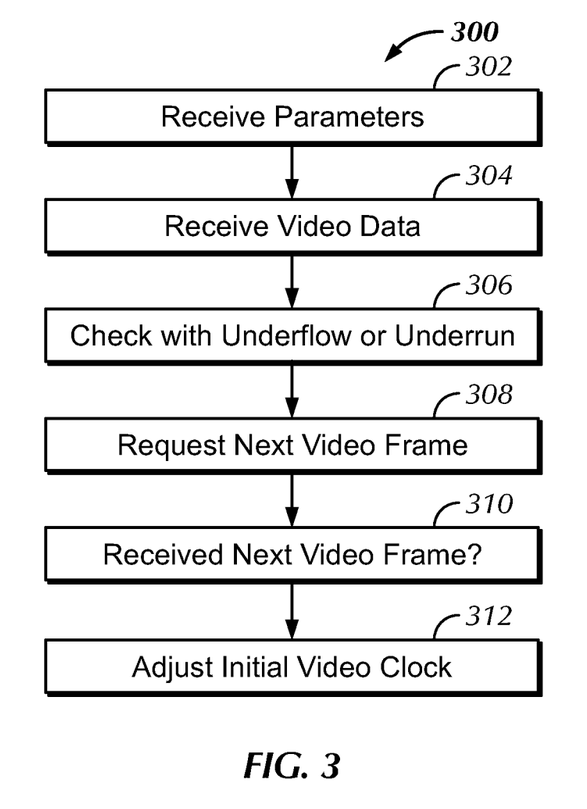
FIG. 3 is a flowchart illustrating one embodiment of the disclosed invention.

FIG. 3 is a flowchart illustrating an exemplary method for implementing the video synchronization device 104 according to an embodiment of the present disclosure. The exemplary method 300 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 300 is described is not intended to be construed as a limitation, and any number of the described method blocks may be combined or otherwise performed in any order to implement the method 300, or an alternate method. Additionally, individual blocks may be deleted from the method without departing from the spirit and scope of the present disclosure described herein. Furthermore, the method 300 may be implemented in any suitable hardware, software, firmware, or combination thereof, that exists in the related art or that is later developed.

The method 300 describes, without limitation, implementation of the method for video synchronization in video distribution systems. A person having ordinary skill in the art will understand that the method 300 may be modified appropriately for implementation in a various manners without departing from the scope and spirit of the disclosure.

At step 302, a plurality of audio and video (AV) parameters may be received from a host device 102. The Video synchronization device 104 may receive multiple AV parameters from the host device 102 via wireless or wired link using any of a variety of transmission media standards known in the art, related art, or developed later including peripheral component interconnect express (PCIe). The AV parameters may be sent over an 8-bit PCIe databus and stored in the system memory 210 of the video synchronization device 104. Each bit may refer to a parameter including, but not limited to, blanking intervals (e.g., HFP, HS, HBP, VFP, VS, VBP), DMA size (i.e., number of pixels or frame size), frame width and height, video clock, adjust pixel clock quantum, cable change type, audio clock and channel, audio clock fractional setting, and video underflow.

At step 304, a plurality of video data signals including video frames may be received at a first frame rate from the host device 102. The video synchronization device 104 may receive multiple video data signals including video frames or video slices at a first frame rate. If a communication data bus such as the PCIe data bus connecting the video synchronization device 104 and the host device 102 is of 8 bits, the video data signal may be sliced into up to maximum of 8 segments. The received video data signals may be stored in the storage unit 202 in communication with the video synchronization device 104.

At step 306, a decision is made about whether an underflow or underrun condition has occurred. In other words, the buffer of the video synchronization device 104 was emptied (referring to removal of the video frames upon being transmitted to the display 106) faster than the host device 102 could refill the buffer of the video synchronization device 104. Under such underflow condition, the video synchronization device 104 may re-transmit or repeatedly send the last transmitted video frame to the display 106 until a next video frame is received in the buffer from the host device 102. This allows the display 106 such as a monitor to keep running or displaying a video frame.

At step 308, the video synchronization device 104 may request a next video frame from the host device 102, which may be configured to provide the next or new video frame having a predefined frame size based on the DMA size, which is an AV parameter stored in the system memory 210.

At step 310, the video synchronization device 104 may determine if the anticipated next video frame is received from the host device 102 or not. The video synchronization device 104 may wait to receive the video frame from the host device 102 and may remain idle until then, back at step 318.

At step 312, the host may adjust the initial video clock of the video synchronization device using the PLL module 212 in response to the AV parameters.

In some embodiments, the video synchronization device 104 may stop transmissions of any video frames in case, the host device 102, the display 106, a networked computing device operatively coupled with a display such as the display 106, or any of their connecting cable(s), are disconnected from the video synchronization device 104.

Figure 4:
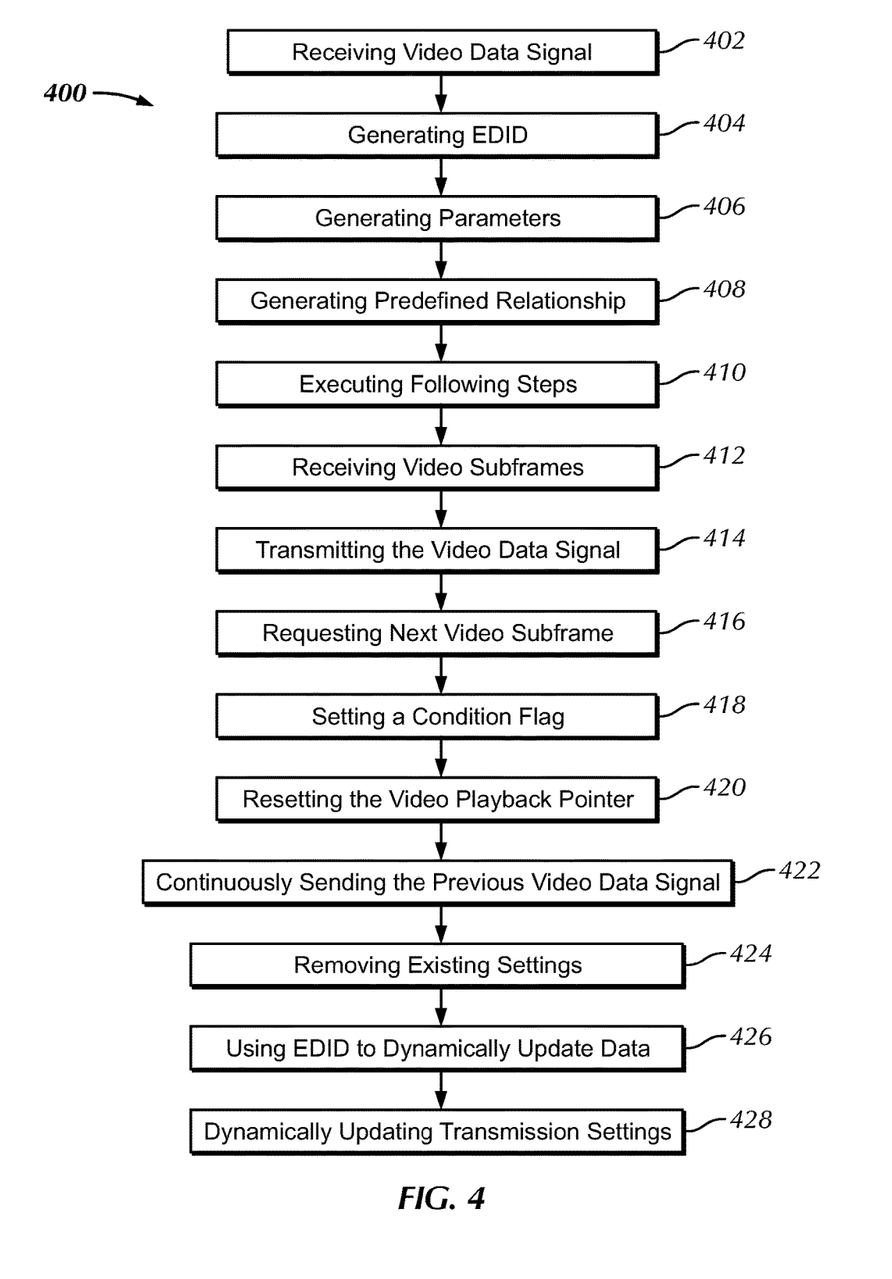
FIG. 4 is a flowchart illustrating another embodiment of the disclosed invention.

FIG. 4 is a flowchart illustrating another embodiment of the disclosed invention of a method to use a video synchronization system that re-synchronizes the video playback of a video synchronization device with that of a host device after any change by the host, interruption within the host, or interruption of video data signals between a video source device and a video display device.

In this embodiment, a video data signal is generated by a video host or source device 102. In addition, a video display device 106 generates an extended display identification data (EDID). This embodiment further includes a video synchronization device 104 with a video synchronization device processor and a video synchronization device memory 210 where the video synchronization device 104 is in communication with the video display device 106, and where the video synchronization device generates one or more video parameters. The video host device 102 includes a host processor and a host memory or storage unit 202, where the host device 102 is coupled to the video synchronization device 104, and the host device generates and stores in the host memory 202 a predefined relationship that is further based on a predefined frame size based on the EDID and the video parameters, where the host device 102 receives the video data signal from the video source device and stores the video data signal in the host memory 202, where the video data signal further includes video subframes at a first frame rate.

At step 402, the video synchronization device 104 receives a video data signal generated by the video source or host device 102.

At step 404, the video display device 106 generates or provides an EDID to the video synchronization device 104.

At step 406, the video synchronization device 104 generates video parameters using the video synchronization device processor and a video synchronization device memory and communicates these parameters with the video display device.

At step 408, the host device 102 generates and stores in host memory 202 a predefined relationship that is further based on a predefined frame size based on the EDID and the video parameters, where host device 102 receives the video data signal from the video source device and stores the video data signal in the host memory 202. The video data signal further includes video subframes at a first frame rate. The host device communicates this information to the video synchronization device 104.

At step 410, the video synchronization device 104 is configured to execute the following steps.

At step 412, the video synchronization device 104 receives one or more video subframes from the video data signal received from the host device 102, where the video subframes are in a predefined relationship to the predefined frame size.

At step 414, the video synchronization device 104 transmits the video data signal to the video display device 106.

At step 416, the video synchronization device 104 requests the host device 102 for a next video subframe having the predefined frame size.

At step 418, the video synchronization device 104 sets a condition flag in the video synchronization device memory 210 that can be read by the host device 102 if the next video subframe is not available at the required time to be transmitted to the video display device 106 in order to notify the host device 102 that an underrun has occurred.

At step 420, the video synchronization device 104 resets the video playback pointer to row one, column one of a new frame. In addition, the video synchronization device 104 flushes the existing data in the video synchronization device memory 210, resets its video playback pointer to row one column one of a new frame, and notifies the host device 102 that the video synchronization device 104 is ready to begin video playback if it is notified by the host device 102 that the frame rate of incoming video must change.

At step 422, video synchronization device 104 continuously sends the previously received video data signal to the video display device 106 using a "frame repeat" function and waits indefinitely for the host device 102 to provide new data representing the pixel at the first row and first column of a new video frame once the flow of the video data into the host device 102 has resumed.

At step 424, the video synchronization device 104 may be configured to remove existing video transmission settings related to or embedded in the last outputted or transmitted video frame and request a new frame from the host device 102 upon detecting a loss of synchronization between the video display device 106 and the host device 102 where the removal of the last transmitted frame data, represented by the existing video transmission settings, prevents any overlap between the last transmitted video frame and a new frame to be transmitted.

At step 426, the video synchronization device 104 uses the EDID to dynamically preset or update the video clock frequency at which it outputs said video data signal.

At step 428, the host device 102 uses the EDID along with information on the frequency with which the video synchronization device 104 is requesting new video data in comparison with the rate at which the host device 102 is receiving video data from the video source device to dynamically adjust the video transmission settings in order to adjust the frame rate of the video synchronization device 104.

To summarize, this disclosure describes a video synchronization device. In one aspect, the present disclosure provides a system that synchronizes a video frame rate between a host device and a display. The system comprises: a host device, with a processor and a memory, generating a plurality of video data signals comprising video frames.

Other embodiments of the present invention will be apparent to those ordinarily skilled in the art after considering this disclosure or practicing the disclosed invention. The specification and examples above are exemplary only, with the true scope of the present invention being determined by the following claims.

We claim the following invention:

1. A video synchronization system that re-synchronizes the video playback of a video synchronization device with that of a host device after any change by the host, interruption within the host, or interruption of video data signals between a video source device and a video display device, comprising:
   a video data signal generated by the video source device;
   a video display device that generates an extended display identification data;
   a video synchronization device with a video synchronization device processor and a video synchronization device memory, said video synchronization device is in communication with sad video display device, said video synchronization device generates video parameters;
   a host device with a host processor and a host memory, said host device is coupled to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;
   said video synchronization device is configured to execute the following steps:
      receive one or more video subframes from said video data signal received from said host device, said video subframes in said predefined relationship to said predefined frame size;
      transmit the video data signal to said video display device;
      request said host device for a next video subframe having said predefined frame size;
      set a condition flag in said video synchronization device memory that can be read by said host device if the next video subframe is not available at the required time to be transmitted to said video display device in order to notify said host device that an underrun has occurred,
      reset the video playback pointer of said video synchronization device to row one, column one of a new frame; and
      continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device may be configured to remove existing video transmission settings related to or embedded in the last outputted or transmitted video frame and request a new frame from said host device upon detecting a loss of synchronization between said video display device and said host device where the removal of the last transmitted frame data, represented by the existing video transmission settings, prevents any overlap between the last transmitted video frame and a new frame to be transmitted.

2. A video synchronization system that re-synchronizes the video playback of a video synchronization device with that of a host device after any change by the host, interruption within the host, or interruption of video data signals between a video source device and a video display device, comprising:

a video data signal generated by the video source device;

a video display device that generates an extended display identification data;

a video synchronization device with a video synchronization device processor and a video synchronization device memory, said video synchronization device is in communication with said video display device, said video synchronization device generates video parameters;

a host device with a host processor and a host memory, said host device is coupled to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device uses said extended display identification data to dynamically preset or update the video clock frequency at which it outputs said video data signal.

3. A video synchronization system that re-synchronizes the video playback of a video synchronization device with that of a host device after any change by the host, interruption within the host, or interruption of video data signals between a video source device and a video display device, comprising:

a video data signal generated by the video source device;

a video display device that generates an extended display identification data;

a video synchronization device with a video synchronization device processor and a video synchronization device memory, said video synchronization device is in communication with said video display device, said video synchronization device generates video parameters;

a host device with a host processor and a host memory, said host device is coupled to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said host device uses said extended display identification data along with information on the frequency with which said video synchronization device is requesting new video data in comparison with the rate at which the said host device is receiving video data from the video source device to dynamically adjust the video transmission settings in order to adjust the frame rate of said video synchronization device.

4. A method to manufacture a video synchronization system that re-synchronizes the video playback of a video synchronization device with that of a host device after any change by the host, interruption within the host, or interruption of video data signals between a video source device and a video display device, comprising:

providing a video data signal generated by the video source device;

providing a video display device that generates an extended display identification data;

coupling a video synchronization device with a video synchronization device processor and a video synchronization device memory said video display device, said video synchronization device generates video parameters;

coupling a host device with a host processor and a host memory to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device may be configured to remove existing video transmission settings related to or embedded in the last outputted or transmitted video frame and request a new frame from said host device upon detecting a loss of synchronization between said video display device and said host device where the removal of the last transmitted frame data, represented by the existing video transmission settings, prevents any overlap between the last transmitted video frame and a new frame to be transmitted.

5. A method to manufacture a video synchronization system that re-synchronizes the video playback of a video synchronization device with that of a host device after any change by the host, interruption within the host, or interruption of video data signals between a video source device and a video display device, comprising:

providing a video data signal generated by the video source device;

providing a video display device that generates an extended display identification data;

coupling a video synchronization device with a video synchronization device processor and a video synchronization device memory said video display device, said video synchronization device generates video parameters;

coupling a host device with a host processor and a host memory to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device uses said extended display identification data to dynamically preset or update the video clock frequency at which it outputs said video data signal.

6. A method to manufacture a video synchronization system that re-synchronizes the video playback of a video synchronization device with that of a host device after any change by the host, interruption within the host, or interruption of video data signals between a video source device and a video display device, comprising:

providing a video data signal generated by the video source device;

providing a video display device that generates an extended display identification data;

coupling a video synchronization device with a video synchronization device processor and a video synchronization device memory said video display device, said video synchronization device generates video parameters;

coupling a host device with a host processor and a host memory to said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said host device uses said extended display identification data along with information on the frequency with which said video synchronization device is requesting new video data in comparison with the rate at which the said host device is receiving video data from the video source device to dynamically adjust the video transmission settings in order to adjust the frame rate of said video synchronization device.

7. A method to use a video synchronization system that re-synchronizes the video playback of a video synchronization device with that of a host device after any change by the host, interruption within the host, or interruption of video data signals between a video source device and a video display device, comprising:

receiving a video data signal generated by the video source device;

generating an extended display identification data using a video display device;

communicating between a video synchronization device with a video synchronization device processor and a video synchronization device memory and said video display device, said video synchronization device generates video parameters;

communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device may be configured to remove existing video transmission settings related to or embedded in the last outputted or transmitted video frame and request a new frame from said host device upon detecting a loss of synchronization between said video display device and said host device where the removal of the last transmitted frame data, represented by the existing video transmission settings, prevents any overlap between the last transmitted video frame and a new frame to be transmitted.

8. A method to use a video synchronization system that re-synchronizes the video playback of a video synchronization device with that of a host device after any change by the host, interruption within the host, or interruption of video data signals between a video source device and a video display device, comprising:

receiving a video data signal generated by the video source device;

generating an extended display identification data using a video display device;

communicating between a video synchronization device with a video synchronization device processor and a video synchronization device memory and said video display device, said video synchronization device generates video parameters;

communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;
request said host device for a next video subframe having said predefined frame size;
set a condition flag in said video synchronization device memory that can be read by said host device if the next video subframe is not available at the required time to be transmitted to said video display device in order to notify said host device that an underrun has occurred,
reset the video playback pointer of said video synchronization device to row one, column one of a new frame; and
continuously send the previously received video data signal to said video display device using a "frame repeat" function and wait indefinitely for said host device to provide new data representing the pixel at the first row and first column of a new video frame once the flow of said video data into said host device has resumed;
wherein said video synchronization device uses said extended display identification data to dynamically preset or update the video clock frequency at which it outputs said video data signal.

9. A method to use a video synchronization system that re-synchronizes the video playback of a video synchronization device with that of a host device after any change by the host, interruption within the host, or interruption of video data signals between a video source device and a video display device, comprising:
receiving a video data signal generated by the video source device;
generating an extended display identification data using a video display device;
communicating between a video synchronization device with a video synchronization device processor and a video synchronization device memory and said video display device, said video synchronization device generates video parameters;
communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;
said video synchronization device is configured to execute the following steps:
receive one or more video subframes from said video data signal received from said host device, said video subframes in said predefined relationship to said predefined frame size;
transmit the video data signal to said video display device;
request said host device for a next video subframe having said predefined frame size;
set a condition flag in said video synchronization device memory that can be read by said host device if the next video subframe is not available at the required time to be transmitted to said video display device in order to notify said host device that an underrun has occurred,
reset the video playback pointer of said video synchronization device to row one, column one of a new frame; and
continuously send the previously received video data signal to said video display device using a "frame repeat" function and wait indefinitely for said host device to provide new data representing the pixel at the first row and first column of a new video frame once the flow of said video data into said host device has resumed;
wherein said host device uses said extended display identification data along with information on the frequency with which said video synchronization device is requesting new video data in comparison with the rate at which the said host device is receiving video data from the video source device to dynamically adjust the video transmission settings in order to adjust the frame rate of said video synchronization device.

10. A non-transitory program storage device readable by a computing device that tangibly embodies a program of instructions executable by the computing device to perform a method to use a video synchronization system that re-synchronizes the video playback of a video synchronization device with that of a host device after any change by the host, interruption within the host, or interruption of video data signals between a video source device and a video display device, comprising:
receiving a video data signal generated by the video source device;
generating an extended display identification data using a video display device;
communicating between a video synchronization device with a video synchronization device processor and a video synchronization device memory and said video display device, said video synchronization device generates video parameters;
communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;
said video synchronization device is configured to execute the following steps:
receive one or more video subframes from said video data signal received from said host device, said video subframes in said predefined relationship to said predefined frame size;
transmit the video data signal to said video display device;
request said host device for a next video subframe having said predefined frame size;
set a condition flag in said video synchronization device memory that can be read by said host device if the next video subframe is not available at the required time to be transmitted to said video display device in order to notify said host device that an underrun has occurred,
reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device may be configured to remove existing video transmission settings related to or embedded in the last outputted or transmitted video frame and request a new frame from said host device upon detecting a loss of synchronization between said video display device and said host device where the removal of the last transmitted frame data, represented by the existing video transmission settings, prevents any overlap between the last transmitted video frame and a new frame to be transmitted.

11. A non-transitory program storage device readable by a computing device that tangibly embodies a program of instructions executable by the computing device to perform a method to use a video synchronization system that re-synchronizes the video playback of a video synchronization device with that of a host device after any change by the host, interruption within the host, or interruption of video data signals between a video source device and a video display device, comprising:

receiving a video data signal generated by the video source device;

generating an extended display identification data using a video display device;

communicating between a video synchronization device with a video synchronization device processor and a video synchronization device memory and said video display device, said video synchronization device generates video parameters;

communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said video synchronization device uses said extended display identification data to dynamically preset or update the video clock frequency at which it outputs said video data signal.

12. A non-transitory program storage device readable by a computing device that tangibly embodies a program of instructions executable by the computing device to perform a method to use a video synchronization system that re-synchronizes the video playback of a video synchronization device with that of a host device after any change by the host, interruption within the host, or interruption of video data signals between a video source device and a video display device, comprising:

receiving a video data signal generated by the video source device;

generating an extended display identification data using a video display device;

communicating between a video synchronization device with a video synchronization device processor and a video synchronization device memory and said video display device, said video synchronization device generates video parameters;

communicating between a host device with a host processor and a host memory, and said video synchronization device, said host device generates and stores in said host memory a predefined relationship that is further based on a predefined frame size based on said extended display identification data and said video parameters, said host device receives said video data signal from the video source device and stores said video data signal in said host memory, said video data signal further comprises video subframes at a first frame rate;

said video synchronization device is configured to execute the following steps:

receive one or more video subframes from said video data signal received from said host device, said video subframes in said predefined relationship to said predefined frame size;

transmit the video data signal to said video display device;

request said host device for a next video subframe having said predefined frame size;

set a condition flag in said video synchronization device memory that can be read by said host device if the next video subframe is not available at the required time to be transmitted to said video display device in order to notify said host device that an underrun has occurred, reset the video playback pointer of said video synchronization device to row one, column one of a new frame; and continuously send the previously received video data signal to said video display device using a "frame repeat" function and wait indefinitely for said host device to provide new data representing the pixel at the first row and first column of a new video frame once the flow of said video data into said host device has resumed;

wherein said host device uses said extended display identification data along with information on the frequency with which said video synchronization device is requesting new video data in comparison with the rate at which the said host device is receiving video data from the video source device to dynamically adjust the video transmission settings in order to adjust the frame rate of said video synchronization device.

13. The claim of claim 1 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

14. The claim of claim 2 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

15. The claim of claim 3 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

16. The claim of claim 4 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

17. The claim of claim 5 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

18. The claim of claim 6 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

19. The claim of claim 7 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

20. The claim of claim 8 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

21. The claim of claim 9 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

22. The claim of claim 10 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

23. The claim of claim 11 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

24. The claim of claim 12 further comprising said video synchronization device flushing the existing data in said video synchronization device memory, resets its video playback pointer to row one column one of a new frame, and notifies said host device that said video synchronization device is ready to begin video playback if it is notified by said host that the frame rate of incoming video must change.

* * * * *

UNITED STATES PATENT AND TRADEMARK OFFICE
CERTIFICATE OF CORRECTION

PATENT NO. : 9,973,795 B2
APPLICATION NO. : 14/837321
DATED : May 15, 2018
INVENTOR(S) : John P. Cunningham et al.

Page 1 of 1

It is certified that error appears in the above-identified patent and that said Letters Patent is hereby corrected as shown below:

On the Title Page

Under "(*) Notice:", Line 3, after "0 days." delete "days.".

In the Specification

In Column 4, Line 48, delete "videotelephone," and insert -- video telephone, --, therefor.

In Column 4, Line 61, delete "videotelephone," and insert -- video telephone, --, therefor.

In Column 12, Lines 29-31, delete "$Frame\ Rate = \dfrac{Video\ Clock}{[(video\ height + HFP + Hsync + HBP) * (video\ width + VFP + Vsync + VBP)]}$" and insert -- $Frame\ Rate = \dfrac{Video\ Clock}{[(video\ height + HFP + Hsync + HBP) * (video\ width + VFP + Vsync + VBP)]}$ --, therefor.

In the Claims

In Column 16, Line 31, in Claim 1, delete "sad" and insert -- said --, therefor.

Signed and Sealed this
Eighteenth Day of September, 2018

Andrei Iancu
*Director of the United States Patent and Trademark Office*